US012560892B1

(12) United States Patent　　　　(10) Patent No.:　US 12,560,892 B1
Volkening　　　　　　　　　　　　　(45) Date of Patent:　　Feb. 24, 2026

(54) WAKEUP DEVICE UTILIZING WEIGHT OF LIQUID TO ENABLE AND DISABLE FUNCTIONALITY

(71) Applicant: Joshua Camden Volkening, Brooklyn, NY (US)

(72) Inventor: Joshua Camden Volkening, Brooklyn, NY (US)

( * ) Notice: Subject to any disclaimer, the term of this patent is extended or adjusted under 35 U.S.C. 154(b) by 396 days.

(21) Appl. No.: 18/117,407

(22) Filed: Mar. 4, 2023

Related U.S. Application Data

(60) Provisional application No. 63/326,223, filed on Mar. 31, 2022.

(51) Int. Cl.
　G04G 13/02　　　　(2006.01)
　G01G 19/52　　　　(2006.01)
　G04B 23/03　　　　(2006.01)
(52) U.S. Cl.
　CPC ........... G04G 13/021 (2013.01); G01G 19/52 (2013.01); G04B 23/03 (2013.01)
(58) Field of Classification Search
　None
　See application file for complete search history.

(56) References Cited

U.S. PATENT DOCUMENTS

| | | | | |
|---|---|---|---|---|
| 4,589,779 A | * | 5/1986 | Hatta | ................... G04G 13/026 |
| | | | | 368/246 |
| 9,798,293 B1 | * | 10/2017 | Roohani | ............ A47G 19/2227 |
| 2013/0200064 A1 | * | 8/2013 | Alexander | .......... A47J 36/2483 |
| | | | | 219/441 |
| 2014/0247010 A1 | * | 9/2014 | Nishiwaki | ............... H02J 50/90 |
| | | | | 320/108 |
| 2016/0007780 A1 | * | 1/2016 | Dolan | .................... B65D 51/24 |
| | | | | 220/315 |

* cited by examiner

*Primary Examiner* — Renee S Luebke
*Assistant Examiner* — Matthew Daniel Hwang
(74) *Attorney, Agent, or Firm* — Joel Douglas

(57)　　　　　　　ABSTRACT

A wakeup device includes an alarm clock with a cup that rests on a load cell. The load cell measures the weight of the cup, thereby detecting the presence or absence of a liquid in the cup. At night if the load cell detects the absence of a liquid in the cup, the device will produce signals that can be disabled by adding liquid to the cup. When the alarm clock goes off to awaken the individual, the alarm clock is snoozed and alarms are disabled for a short period when the load cell detects that the cup has been picked up. To turn the alarm off completely, the individual must consume or dispose of the liquid in the cup and put it back on the load cell so that it detects the presence of an empty cup.

19 Claims, 5 Drawing Sheets

201

301

303

305

309

311

313

11:37am

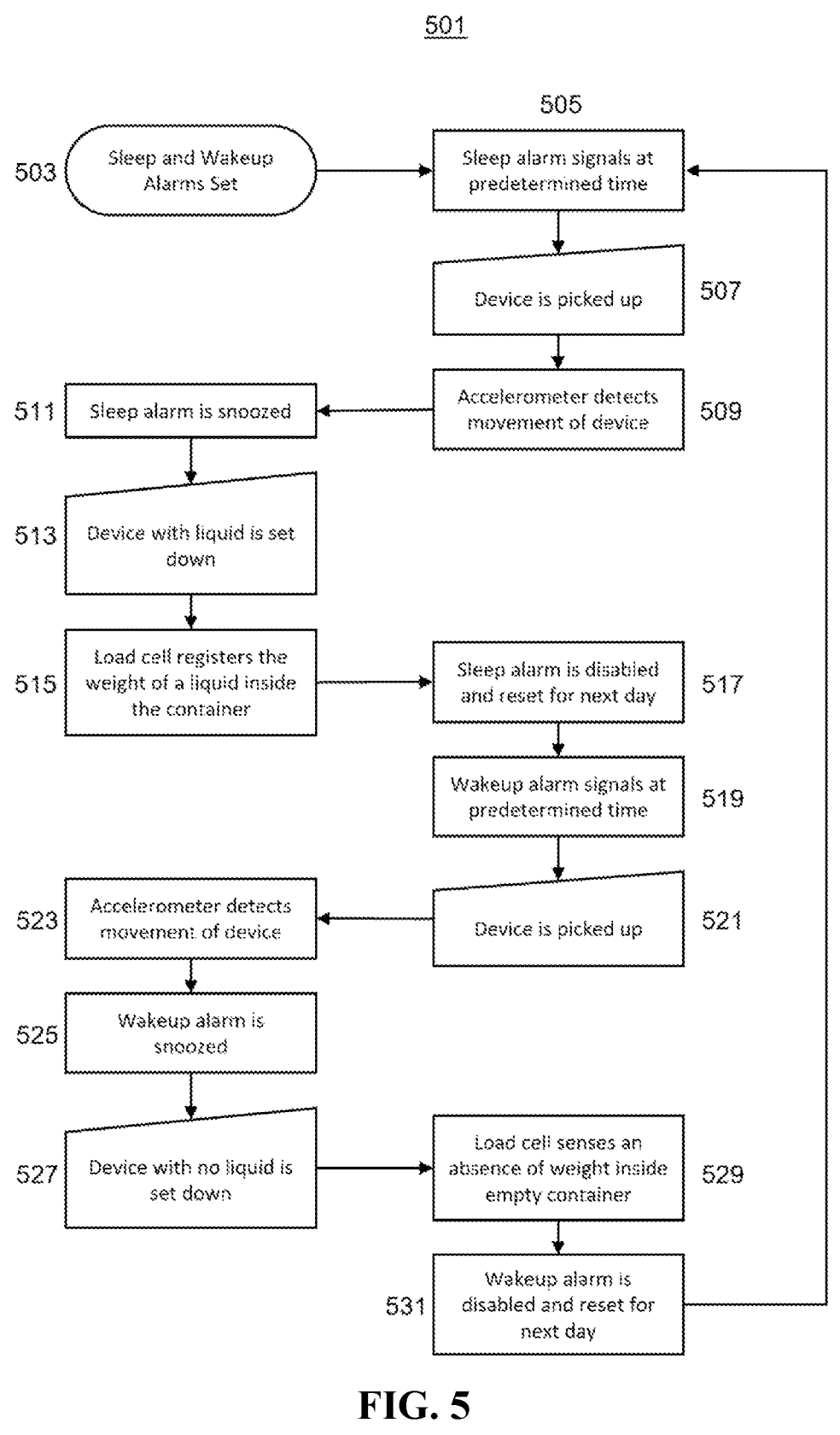

501

505

503  Sleep and Wakeup Alarms Set → Sleep alarm signals at predetermined time

Device is picked up  507

511  Sleep alarm is snoozed ← Accelerometer detects movement of device  509

513  Device with liquid is set down

515  Load cell registers the weight of a liquid inside the container → Sleep alarm is disabled and reset for next day  517

Wakeup alarm signals at predetermined time  519

523  Accelerometer detects movement of device ← Device is picked up  521

525  Wakeup alarm is snoozed

527  Device with no liquid is set down → Load cell senses an absence of weight inside empty container  529

531  Wakeup alarm is disabled and reset for next day

FIG. 5

WAKEUP DEVICE UTILIZING WEIGHT OF LIQUID TO ENABLE AND DISABLE FUNCTIONALITY

TECHNICAL FIELD

The invention relates to alarm clocks and more particularly to methods used in alarm clocks to ensure that the user of the alarm clock is fully awake before the user can disable the alarm.

BACKGROUND

In today's world, people rely heavily on technology, and devices have become an integral part of everyday life. One such device that most people use is an alarm clock, which awakens them from sleep at a predetermined time.

Traditional alarm clocks awaken the user at a predetermined time via audial and/or visual alerts. However, many people struggle with getting out of bed in the morning and starting their day because they have difficulty waking up to these disturbances. Also, traditional alarm clocks can usually be snoozed or turned off easily, leaving people feeling groggy and unmotivated, oftentimes going back to sleep as a result. This often causes lateness, missed appointments, or even lost opportunities.

Some methods have been developed that require users to perform actions before their alarm can be disabled, such as standing up or chasing a device that is designed to move away from them. The problems that remain with these methods is that they are usually unpleasant and annoying, which means that users are unlikely to want to continually utilize these methods. An additional problem is that these methods may fail to truly rouse a user from sleep, as the techniques do not aid in the user's physiological waking process.

Additionally, dehydration is a common issue in the morning, which can lead to fatigue and a slower start to the day. It is an object of the invention to provide a wakeup device that contains a liquid and requires the sleeper to consume or dispose of the liquid to turn the wakeup device off. This will arouse the user from sleep pleasantly and assist their physiological waking process, ensuring they start the day hydrated and energized.

SUMMARY

The object of the invention is achieved by means of a wakeup device that detects the presence or absence of a liquid in a cup by measuring the weight of the cup. When the user should be getting ready to go to sleep, the device will notify the user with an alarm that can only be disabled by filling the cup with liquid. When the user should be waking up from sleep, an alarm will awaken the user which can only be disabled after the user drinks the liquid from the cup.

The advantages of the invention are several. Following a consistent sleep schedule is the best way to achieve better sleep, and this method encourages this healthy habit by requiring consistent actions at the same time every morning and night. Additionally, this method requires water intake at a time when one is usually dehydrated to some degree, having consumed no water for many hours while asleep. As hydration is essential to mental and physical health, consuming water is a healthy aid in the physical process of waking up.

In one or more embodiments, the invention comprises a cup accompanied by a separate base component containing a load cell which the cup sits on. When the device signals that it is time to for the user to sleep, the signals will cease when the load cell detects the weight of a filled cup. When the wakeup alarm event occurs, a temporary cessation of the wakeup alarm is caused once the load cell detects no cup is present, and the wakeup alarm will cease entirely when the load cell detects the weight of the empty cup. It is a further aspect of this invention that the base component of the wakeup device contain the time display of the alarm clock, allowing the time to be viewed easily by the individual.

In another aspect of the invention, the cup and the base component are connected such that the invention is a single device. An accelerometer housed in the base component will cause the temporary cessation of the wakeup alarm if it detects motion that can be assumed to be the user picking up the invention in order to consume the liquid.

Perusal of the following Detailed Description and drawing will make apparent other objects and advantages to those skilled in the arts to which the invention pertains, wherein:

BRIEF DESCRIPTION OF DRAWINGS

FIG. 5 shows a flowchart for the operation of the device in FIG. 3 and FIG. 4.

DETAILED DESCRIPTION

Figure 1:
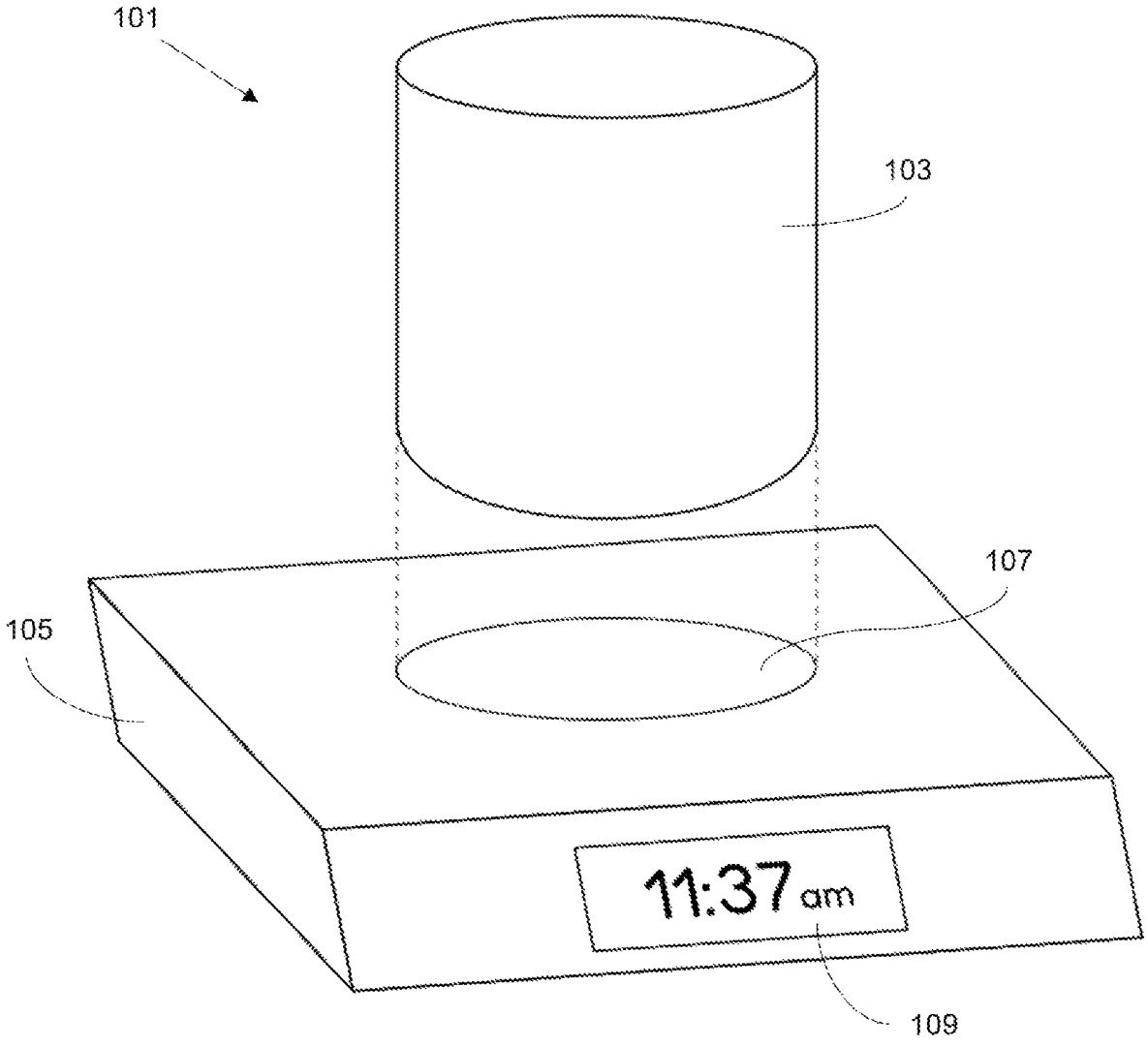
FIG. 1 shows a wakeup device with a separate base component.

FIG. 1 shows a presently-preferred embodiment 101 of a wakeup device utilizing weight of a liquid to enable and/or disable functionality. As is true of most alarm clocks, device 101 is placed next to a user's bed. Device 101 has a base component 105 that contains and protects the internal workings of the device. Not shown, but included in most alarm clocks are buttons for choosing whether a time value or an alarm time value is to be set and buttons for advancing the values of the time value or alarm time value. On the front of the device's base component 105 is a Liquid Crystal Diode or Light-Emitting Diode (LCD/LED) 109 for displaying the time. The middle of the base component 105 contains a load cell 107 that can measure the weight of an object placed on it. Device 101 further includes a cup 103 that rests on the load cell 107. This allows the wakeup device 101 to determine if the cup 103 is either absent, present and empty, or present and full of a liquid, based on the weight the load cell is measuring.

Figure 2:
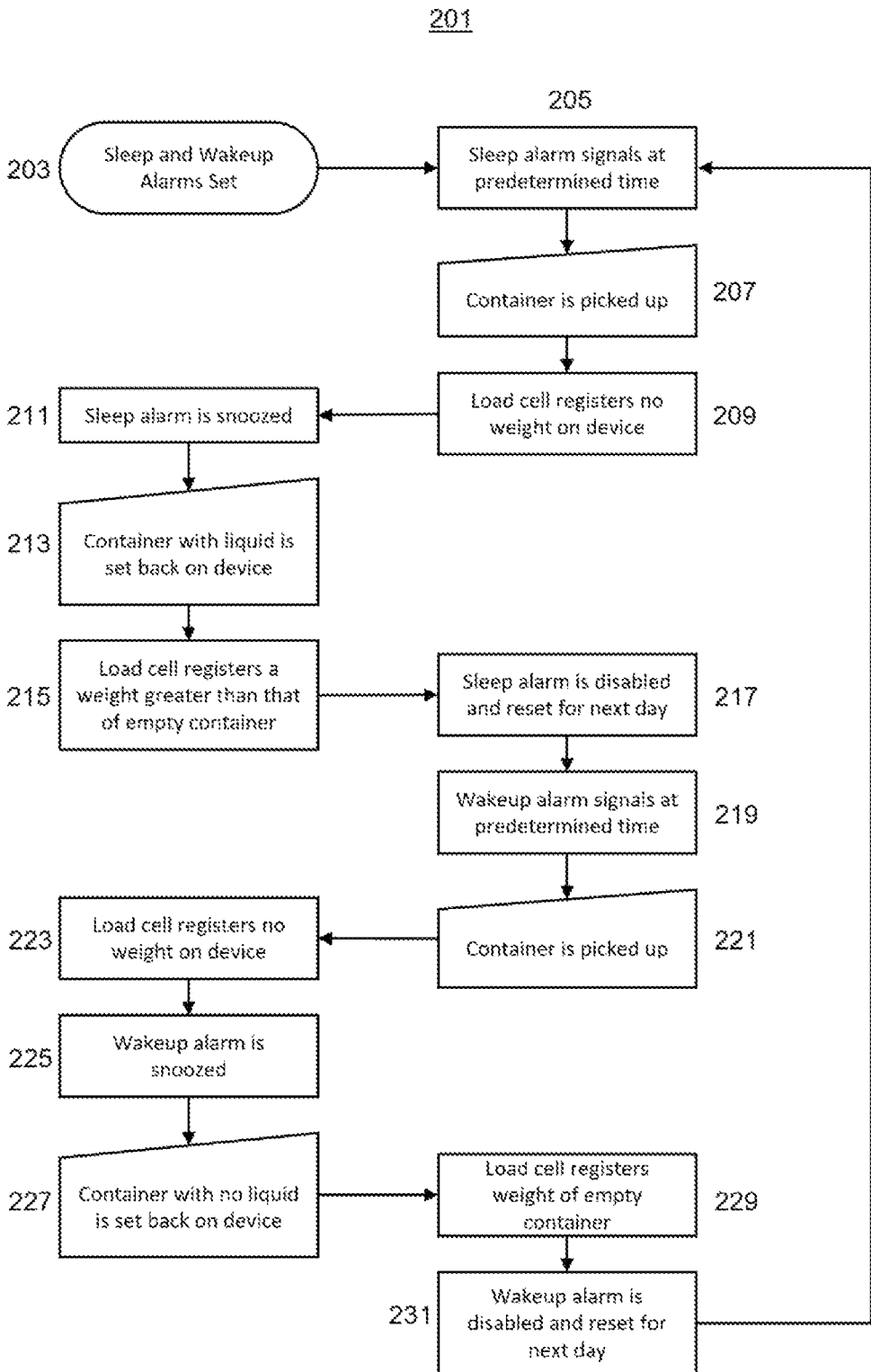
FIG. 2 shows a flowchart for the operation of the device in FIG. 1.

FIG. 2 shows a flowchart 201 of how wakeup device 101 responds to alarm events. Flowchart 201 starts when the device's alarms have been set (203). When the time that the sleep alarm is set for has been reached, alarms are signaled from the device 101 (205). The user picks up cup 103 from the load cell 107 on the base component 105 (207). The load cell 107 measures no weight due to the absence of the cup 103 (209). The measurement of no weight from the load cell 107 causes the sleep alarms to be temporarily disabled or "snoozed" (211). The user then replaces the cup 103 with liquid inside of it onto the load cell 107 on the device's base component 105 (213). The load cell 107 measures the weight of a full cup 103 (215). The measurement of a full cup from the load cell 107 causes the sleep alarm to be disabled until the time that the sleep alarm is set for is reached again on the following day (217). When the time that the wakeup alarm is set for has been reached, alarms are signaled from the device 101 (219). The user picks up cup 103 from the load cell 107 on the base component 105 (221). The load cell 107 measures no weight due to the absence of the cup 103 (223). The measurement of no weight from the load cell 107 causes the wakeup alarms to be temporarily disabled or "snoozed" (225). The user disposes of the liquid inside of cup 103, typically by consuming it. The user then replaces the empty cup 103 onto the load cell 107 on the device's base component 105 (227). The load cell 107 measures the weight of an empty cup 103 (229). The measurement of an empty cup 103 from the load cell 107 causes the wakeup alarm to be disabled until the time that the wakeup alarm is set for is reached again on the following day (231).

Figure 3:
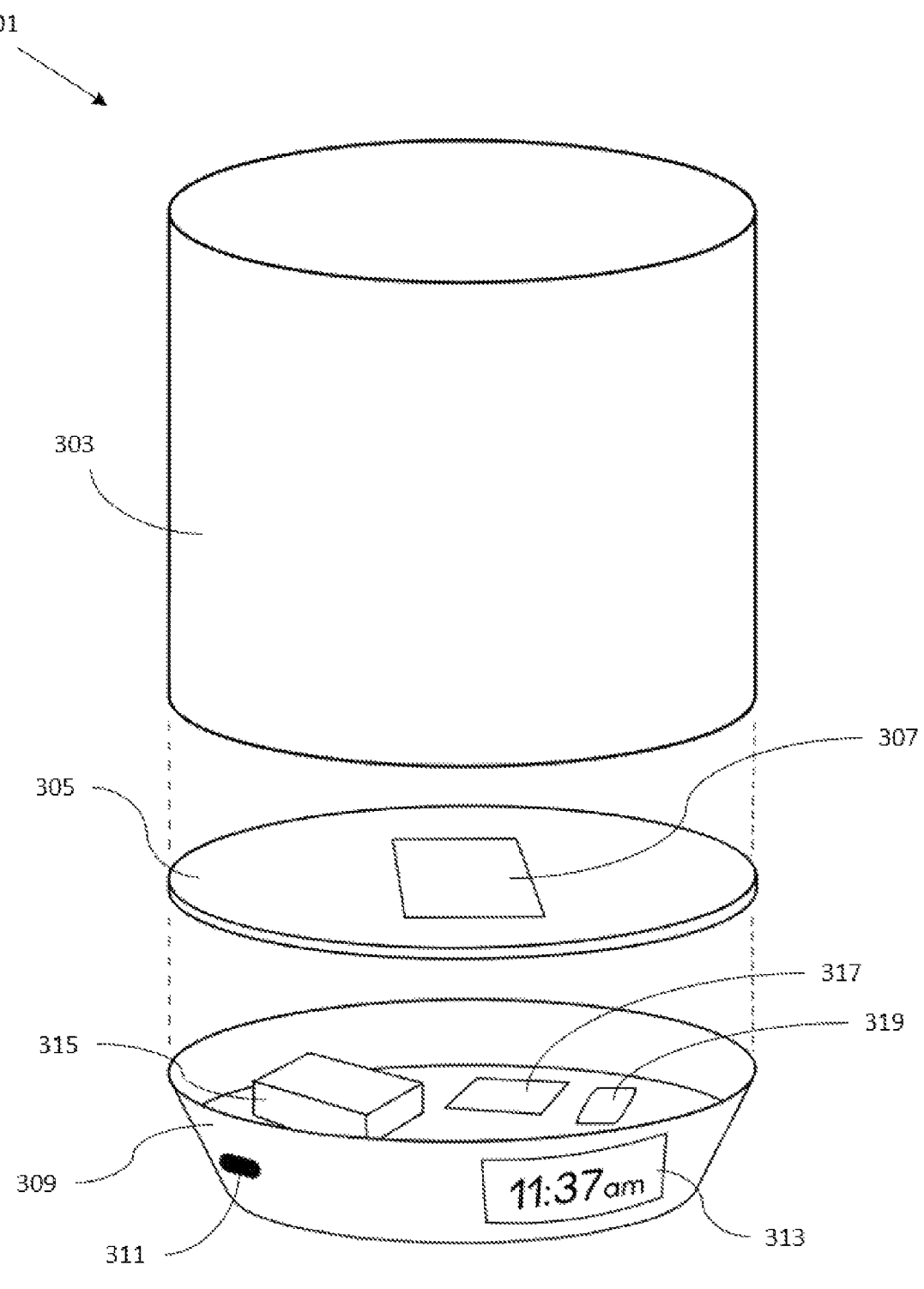
FIG. 3 shows an exploded view of a wakeup device with a connected base component.

FIG. 3 shows an exploded view of one embodiment of the invention, in which a base component 309 is attached to a cup 303, creating a single device 301. The base component 309 contains the device's internal workings, such as a battery 315, a circuit board 317 and an accelerometer 319. Located on the outside of the base component 309 is an input 311 for charging the battery 315, as well as a Liquid Crystal Diode or Light-Emitting Diode (LCD/LED) display 313 for showing the time. A diaphragm 305 connects the base component 309 and the cup walls 303. In the middle of the diaphragm 305 is a load cell 307 that measures the weight of any liquid inside of the cup 303.

Figure 4:
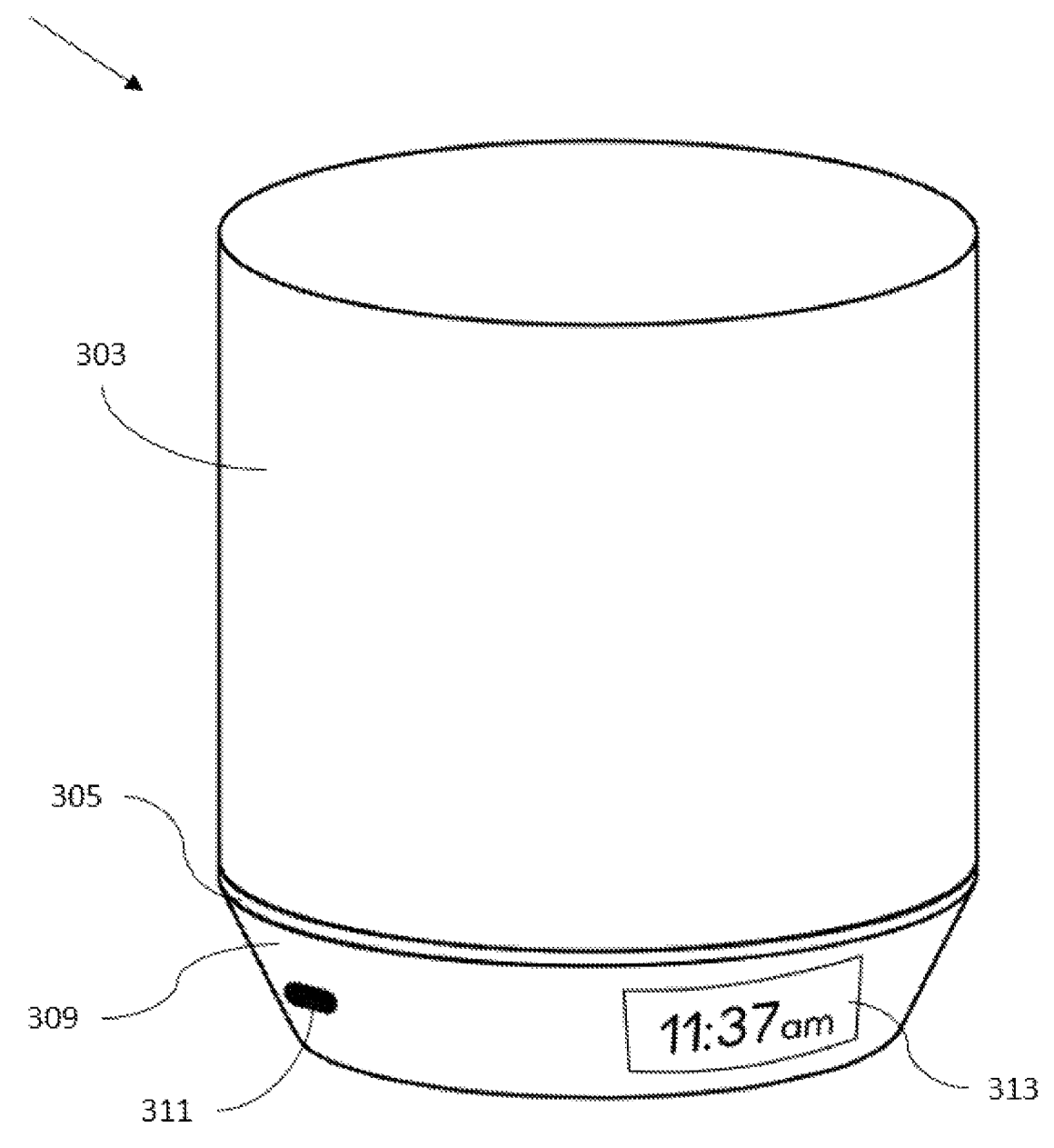
FIG. 4 shows a wakeup device with a connected base component.

FIG. 4 Illustrates the view of device 301 when all parts are connected. The base component 309 is connected to the diaphragm 305, which is connected to the cup walls 303. Still visible are the LCD/LED display 313 and the charging input 311.

FIG. 5 shows a flowchart 501 of how wakeup device 301 responds to alarm events. Flowchart 501 starts when the device's alarms have been set (503). When the time that the sleep alarm is set for has been reached, alarms are signaled from the device 301 (505). The user picks up the device 301 (507). The accelerometer 319 detects movement (509). The movement detected by the accelerometer 319 causes the sleep alarms to be temporarily disabled or "snoozed" (511). The user then fills the cup 303 with liquid and puts the device 301 back down. (513). The load cell 307 measures the weight of the liquid inside of the cup 303 (515). The measurement of the weight of the liquid from the load cell 307 causes the sleep alarm to be disabled until the time that the sleep alarm is set for is reached again on the following day (517). When the time that the wakeup alarm is set for has been reached, alarms are signaled from the device 301 (519). The user picks up the device 301 (521). The accelerometer 319 detects movement (523). The movement detected by the accelerometer 319 causes the wakeup alarms to be temporarily disabled or "snoozed" (525). The user disposes of the liquid inside of cup 303, typically by consuming it, and then sets the empty device 301 back down (527). The load cell 307 measures no weight because the cup 303 is empty (529). The measurement of an empty cup from the load cell 307 causes the wakeup alarm to be disabled until the time that the wakeup alarm is set for is reached again on the following day (531).

CONCLUSION

The foregoing Detailed Description has disclosed to those skilled in the relevant technologies how to make and use a wakeup device that utilizes the weight of liquid to enable and disable functionality. The foregoing description has further disclosed the best mode presently known to the inventor for implementing the invention, however the description of the invention is merely exemplary in nature and the breadth of the invention disclosed herein is to be determined not from the Detailed Description, but rather from the claims as interpreted with the full breadth permitted by the patent laws.

The invention claimed is:

1. An alarm device comprising:
   a cup,
   a base component upon which the cup can sit, the base component including,
   a clock,
   an alarm,
   a load cell upon which the cup can sit, and which measures weight supported thereon, and
   a controller that is responsive to the load cell's measurements, the controller responding to the measurements of the load cell to control at least one set alarm by at least one of silencing the set alarm for a snooze period and disabling the set alarm until a set time on a following day,
   the at least one set alarm including a sleep alarm and the controller, in response to the load cell measuring a weight greater than that of an empty cup after the sleep alarm has been activated, disables the sleep alarm until a set time on a following day.

2. The alarm device of claim 1, wherein: in response to the load cell measuring no weight, a currently activated alarm event is silenced for a snooze period by the controller.

3. The alarm device of claim 1 wherein: the at least one set alarm also includes a wakeup alarm and the controller, in response to the load cell measuring a weight that indicates an empty cup after the wakeup alarm has been activated, disables the wakeup alarm until a set time on a following day.

4. The alarm device of claim 1, wherein: the cup contains a lid that prevents a liquid in the cup from spilling if the cup is accidentally knocked over.

5. The alarm device of claim 1, wherein: the cup and the base component contain magnets which help them align to facilitate correct placement of the cup on the load cell to measure the weight of the cup.

6. An alarm device comprising:
   a cup,
   a weight sensor that supports the cup and which measures weight supported thereon,
   a clock with an associated alarm function that allows setting at least one set alarm including at least a sleep alarm to be activated at a set sleep time each day, and
   a controller that is responsive to the weight sensor's measurements and which, in response to the weight sensor measuring a weight greater than that of an empty cup after the sleep alarm has been activated, disables the sleep alarm until the set sleep time on a following day.

7. The alarm device of claim 6, wherein: the weight sensor, the clock, and the controller are contained in a base component upon which the cup can sit.

8. The alarm device of claim 6, wherein: in response to the weight sensor measuring no weight supported thereon after the sleep alarm has been activated, the controller silences the sleep alarm for a snooze period.

9. The alarm device of claim 6 wherein:
   the at least one set alarm also includes a wakeup alarm to be activated at a set wakeup time each day, and the controller, in response to the weight sensor measuring a weight that indicates an empty cup after the wakeup alarm has been activated, disables the wakeup alarm until the set wakeup time on a following day.

10. The alarm device of claim 9, wherein: in response to the weight sensor measuring no weight supported thereon after the wakeup alarm has been activated, the controller silences the wakeup alarm for a snooze period.

11. The alarm device of claim 6, wherein: the cup contains a lid that prevents a liquid in the cup from spilling if the cup is accidentally knocked over.

12. The alarm device of claim 6, wherein: the cup and the base component contain magnets which help them align to facilitate correct placement of the cup on the weight sensor to measure the weight of the cup.

13. An alarm device comprising:

a cup, a weight sensor that measures weight supported thereon, the weight sensor being associated with the cup by either supporting the cup or being incorporated into the cup so as to measure the weight of liquid in the cup, a clock with an associated alarm function that allows setting at least one alarm including at least a sleep alarm, and a controller that controls the at least one alarm responsive to the weight sensor's measurements, such control including at least an action of disabling the sleep alarm until a set time on a following day in response to the weight sensor measuring a weight greater than that of an empty cup after the sleep alarm has been activated.

14. The alarm device of claim 13 wherein the weight sensor is located in a base component and supports the cup.

15. The alarm device of claim 14 wherein the clock and the controller are also located in the base component.

16. The alarm device of claim 14 wherein the controller, in response to the weight sensor measuring no weight supported thereon after the sleep alarm has been activated, silences the sleep alarm for a snooze period.

17. The alarm device of claim 13 wherein the weight sensor is incorporated into the cup, the device further comprising:

an accelerometer that detects motion of the cup, and the controller being responsive to the accelerometer such that, in response to the accelerometer indicating motion of the cup after the sleep alarm has been activated, the controller silences the sleep alarm for a snooze period.

18. The alarm device of claim 17, wherein:

the at least one alarm also includes a wakeup alarm to be activated at a set wakeup time each day, and the controller, in response to the weight sensor measuring a weight that indicates an empty cup after the wakeup alarm has been activated, disables the wakeup alarm until the set wakeup time on a following day.

19. The alarm device of claim 18, wherein: the controller, in response to the accelerometer indicating motion of the cup after the wakeup alarm has been activated, silences the wakeup alarm for a snooze period.

* * * * *